United States Patent
Kang

(10) Patent No.: US 7,050,295 B2
(45) Date of Patent: May 23, 2006

(54) BIDIRECTIONAL LATCH ASSEMBLY AND ELECTRONIC APPARATUSES USING THE SAME

(75) Inventor: Lai-O Kang, Pyeongtaek-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 10/784,759

(22) Filed: Feb. 24, 2004

(65) Prior Publication Data

US 2005/0036284 A1 Feb. 17, 2005

(30) Foreign Application Priority Data

Aug. 11, 2003 (KR) .................. 10-2003-0055521

(51) Int. Cl.
*H05K 5/00* (2006.01)

(52) U.S. Cl. .................. 361/683; 361/727; 292/137; 312/223.2; 312/222; 312/327; 312/329

(58) Field of Classification Search ................ 292/121, 292/122, 101, 106, 137, 163, 175; 312/223.2, 312/215, 222, 327, 329, 392; 361/679–687, 361/724–727
See application file for complete search history.

(56) References Cited

U.S. PATENT DOCUMENTS 6,068,307 A * 5/2000 Murphy .................. 292/302
6,707,665 B1 * 3/2004 Hsu et al. .................. 361/681

OTHER PUBLICATIONS

Toshiba tablet computer, model "portégé M200/205 series".
Acer tablet computer, model "Travel C100 Convertible Tablet PC".

* cited by examiner

*Primary Examiner*—Anatoly Vortman
*Assistant Examiner*—Zachary M. Pape
(74) *Attorney, Agent, or Firm*—Fleshner & Kim, LLP

(57) ABSTRACT

Embodiments of a bidirectional latch assembly, methods for using same and an electronic apparatus using the same can provide a bidirectional latch assembly whereby both faces of one of two bodies constituting an electronic apparatus can be selectively latched to the other body. A bidirectional latch assembly can include a casing having a seating groove formed with a passage hole, a pressure member in the seating groove and having a seating surface on one side thereof, and a latch insertable into the passage hole and having one surface seated on the seating surface. The latch can include a frame formed with a pair of latching holes on opposite sides therein, and a pair of catching protrusions integrally formed with the frame at opposite edges along the sides (e.g., middle) of the frame. A keeper can selectively engage with either one of the pair of latching holes.

30 Claims, 19 Drawing Sheets

BIDIRECTIONAL LATCH ASSEMBLY AND ELECTRONIC APPARATUSES USING THE SAME

BACKGROUND OF THE INVENTION

1. Field of the Invention

The present invention relates to a latch assembly, and more particularly, to a bidirectionally lockable latch assembly.

2. Background of the Related Art

A latch structure is used to lock or unlock a first body to or from a second body. There have been proposed a variety of latch structures.

As shown in FIGS. 1a–1b, a prior art latch structure for use in a notebook computer has a latch knob 44 provided with a support 42 installed at one side of a keyboard unit 40 of a notebook computer 10 in a state where it slightly protrudes outward. A fixed holder 48 with a fixed shaft 46 protruding from a middle portion thereof is secured on a top surface of the support 42.

A latch member 54, which has a curved cam portion 50 in an intermediate portion thereof and a catching portion 52 at a distal end thereof, is vertically coupled to pivot on the fixed shaft 46. A resilient spring 60 integrally provided with first and second resilient support portions 56 and 58 on both sides thereof with respect to the fixed shaft 46 is attached to an outer surface of the latch member 54. The first resilient support portion 56 is resiliently supported on a top surface of the fixed holder 48, and the second resilient support portion 58 opposite to the first resilient support portion 56 is inserted into and resiliently supported by a groove 62 formed in the outer surface of the latch member 54. Accordingly, the cam portion 50 of the latch member 54 is pressed against an inner surface of the latch knob 44.

Further, a through-hole 64 is formed at a front end portion of the keyboard unit 40 that vertically faces the catching portion 52 of the latch member 54. A hook 70 provided with a through-hole 68 at the center thereof is secured on a front end portion of a display unit 66, which corresponds to the through-hole 64.

When a user first presses the knob formed at one side of the keyboard unit 40 with a certain force as shown in FIG. 1a in a state where the notebook computer 10 is not in use (i.e., closed), the cam portion 50 of the latch member 54 that is in close contact with the inner surface of the latch knob 44 pivots on the fixed shaft 46 in a counterclockwise direction. With the pivoting of the cam portion 50, the catching portion 52 of the latch member 54 interlocked with the cam portion 50 also pivots.

Meanwhile, when the user removes the force, that has been exerted on the latch knob 44, in a state where the hook 70 protruding from the display unit 66 of the notebook computer 10 is fully inserted into the through-hole 64 of the keyboard unit 40, the latch member 54 moves in a clockwise direction because of a resilient force of the second resilient support portion 58 that is resiliently supported by the groove 62 formed in the outer surface of the latch member 54, as shown in FIG. 1b. With the movement, the catching portion 52 of the latch member 54 is inserted into and closely engaged with the through-hole 68 of the hook 70 so that the display unit 66 and the keyboard unit 40 are fastened to each other.

As described above, the prior art latch structure shown in FIGS. 1a–1b has various disadvantages. The prior art latch structure can lock a display unit to a main body of an electronic apparatus only in a unidirectional manner. However, there is a need for selective locking of front and rear faces of a display unit to a main body of portable computer such as a tablet computer or the like that has a swivel hinge.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a bidirectionally lockable latch assembly and method.

Another object of the present invention is to provide a bidirectionally lockable latch assembly and method capable of enabling both faces of a display unit of a notebook or tablet computer to be selectively locked to a main body thereof.

Another object of the present invention is to provide a lockable latch assembly capable of bidirectional direction change.

Another object of the present invention is to provide a bidirectionally lockable latch assembly and method that can reduce locking failure during a locking operation.

In order to achieve at feast the above objects and advantages in a whole or in part, in accordance with one aspect of the present invention there is provided a bidirectional latch assembly that includes a casing configured with a seating groove, wherein the seating groove includes a passage hole, a latch inserted into the passage hole having one surface movably seated on a seating surface supported in the seating groove, wherein the latch comprises a frame configured with a pair of opposing latching holes, and a pair of catching protrusions on lateral edges of the frame, and a keeper configured to selectively engage with either one of the pair of latching holes.

To further achieve at least the above objects in a whole or in part, in accordance with one aspect of the present invention there is provided an electronic apparatus that includes a first body configured with a passage hole extending through one side portion, a latch mounted in the passage hole of the first body having a frame with a pair of engagement protrusions on opposite sides, a second body rotatably coupled to the first body and having a recess on one surface thereof, and an engagement catch mounted in the recess of the second body.

To further achieve at least the above objects in a whole or in part, in accordance with one aspect of the present invention there is provided a method of latching a portable computer having a first body rotatably coupled to one side of a main body, wherein the first body has a first surface adjacent to the main body in a first closed position and an opposite surface adjacent to the main body in a second closed position of the portable computer, the method includes providing a bi-directional latch in a through hole of the first body to latch the first body to the main body in the closed positions, releasing an engagement catch of the main body from a first engagement protrusion of the bi-directional latch in the first closed position, pressing the first engagement protrusion to position a second engagement protrusion of the bi-directional latch; and moving the first body to the second closed position to latch the second engagement protrusion in the engagement catch.

To further achieve at least the above objects in a whole or in part, in accordance with one aspect of the present invention there is provided a method of latching a portable computer having a first body rotatably coupled to one side of a main body, wherein the first body has a first surface adjacent to the main body in a first closed position and an opposite surface adjacent to the main body in a second closed position of the portable computer, the method includes providing a bi-directional latch in the first body to latch the first body to the main body in the closed positions, releasing an engagement catch of the main body from a first engagement protrusion of the bi-directional latch in the first closed position, moving the first body to the second closed position, and pressing the first engagement protrusion to latch a second engagement protrusion of the bi-directional latch in the engagement catch, wherein the first and second engagement protrusions extend from opposite sides of the first body.

To further achieve at least the above objects in a whole or in part, in accordance with one aspect of the present invention there is provided an electronic apparatus that includes a first body formed with a passage hole extending through one side portion, latching unit for latching mounted in the passage hole of the first body having a frame with a pair of engagement protrusions that protrude on opposite sides in first and second portions, respectively, a second body rotatably coupled to the first body and having a recess on one surface thereof, and engaging unit for engaging the latching unit mounted in the recess of the second body.

To further achieve at least the above objects in a whole or in part, in accordance with one aspect of the present invention there is provided a method of latching a portable computer having a first body rotatably coupled to one side of a main body, wherein the first body has a first surface adjacent to the main body in a first closed position and an opposite surface adjacent to the main body in a second closed position of the portable computer, the method includes providing a through hole in the first body, providing a latch in the through hole of the first body, and latching the latch to fix the first body to the main body in the closed portions.

To further achieve at least the above objects in a whole or in part, in accordance with one aspect of the present invention there is provided a portable computer having a first body rotatably coupled to one side of a main body, wherein the first body has a first surface adjacent to the main body in a first closed position of the portable computer and an opposite surface adjacent to the main body in a second closed position, the portable computer, including a latch in the passage hole of the first body configured with first and second engagement protrusions that protrude on opposite sides of the first body in first and second positions, respectively, and an engagement catch in the recess of the main body configured to engage the latch in the closed positions.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2b is diagram showing an exploded perspective view of the latch unit shown in FIG. 2a;

FIG. 9c is a diagram showing an enlarged view of a portion in FIG. 9a; and

DETAILED DESCRIPTION OF PREFERRED EMBODIMENTS

Figure 1A:
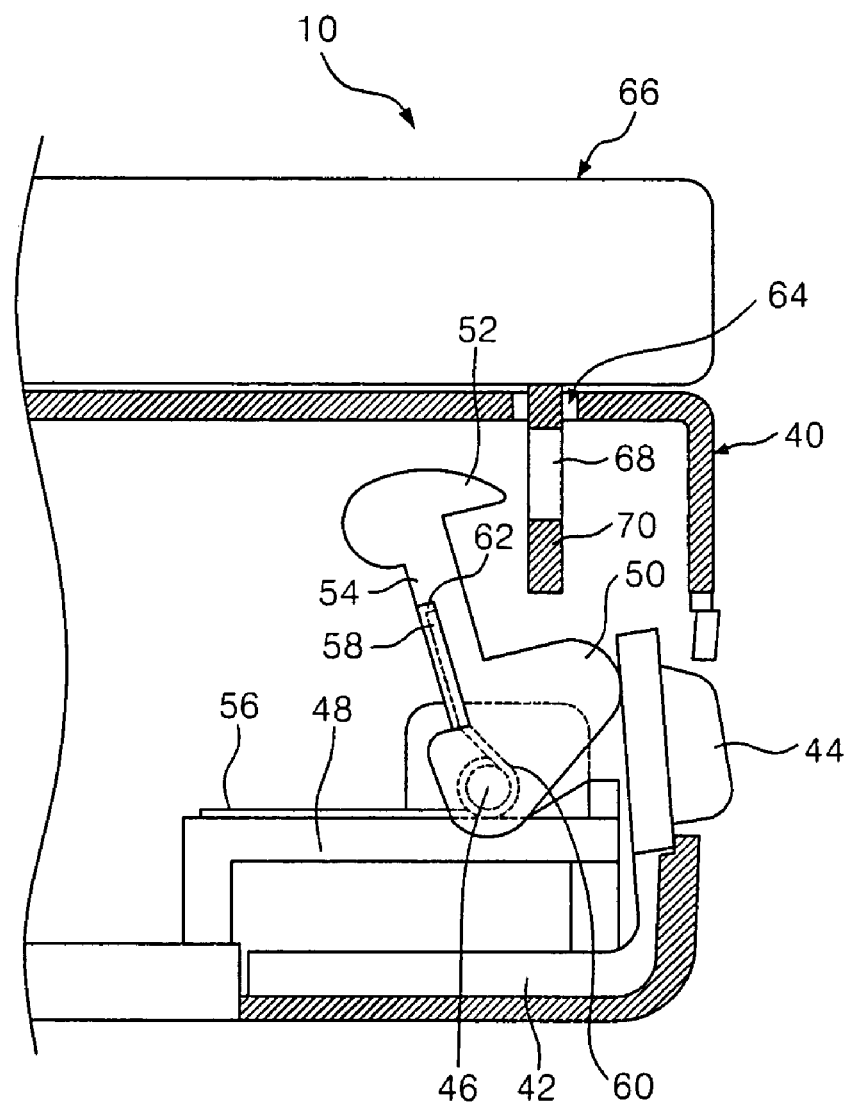
FIGS. 1a and 1b are diagrams showing sectional views of a prior art latch structure.
Figure 1B:
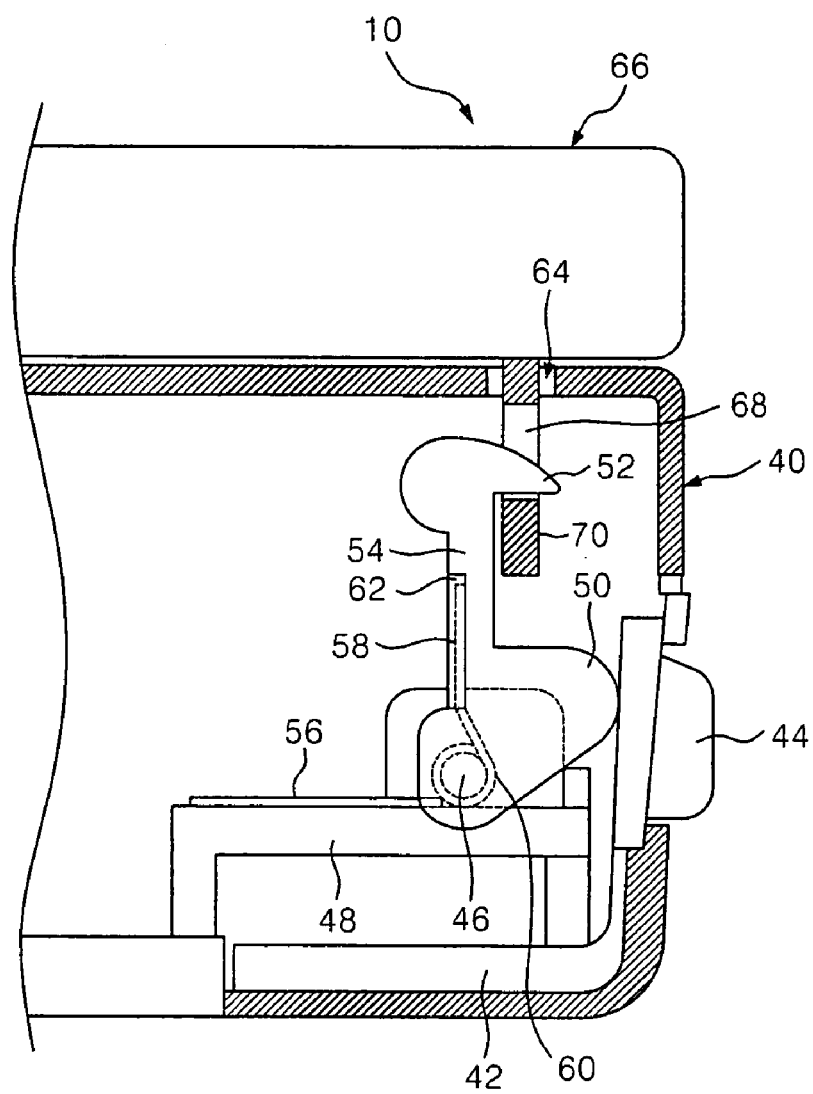
Figure 2A:
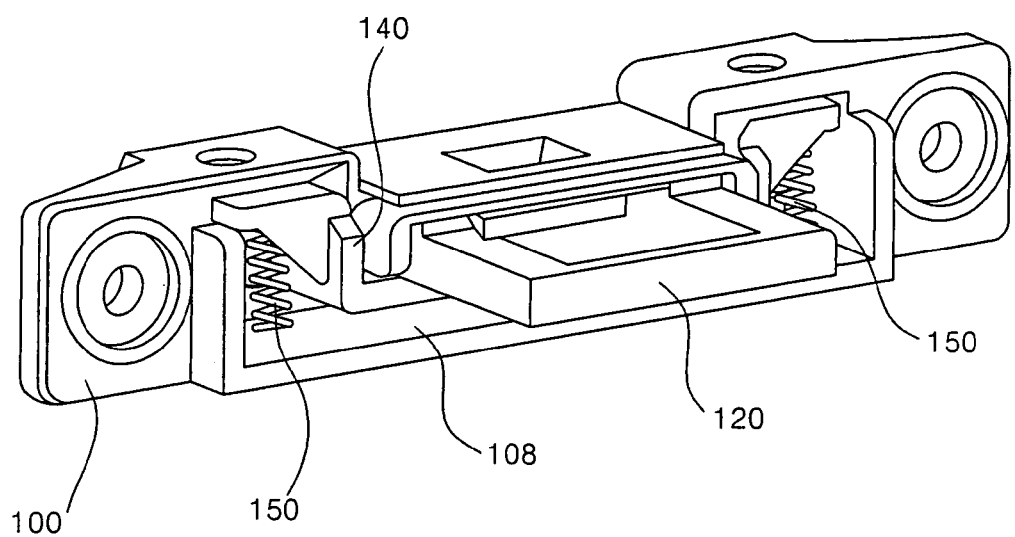
FIG. 2a is a diagram showing a perspective view of a latch unit of a latch assembly according to a preferred embodiment of the present invention.
Figure 2B:
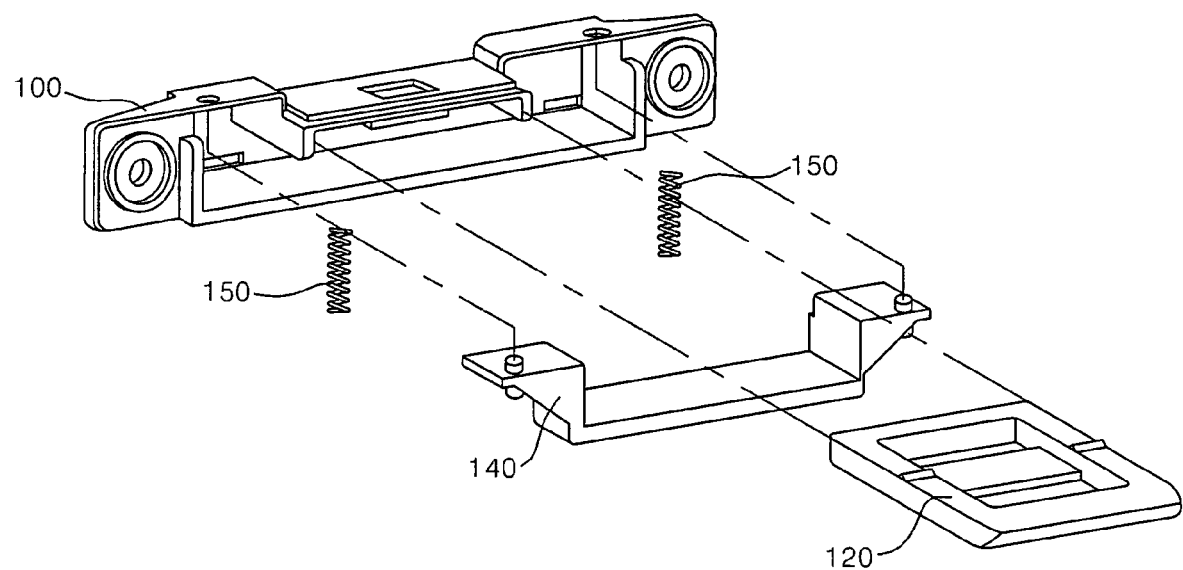
Figure 2C:
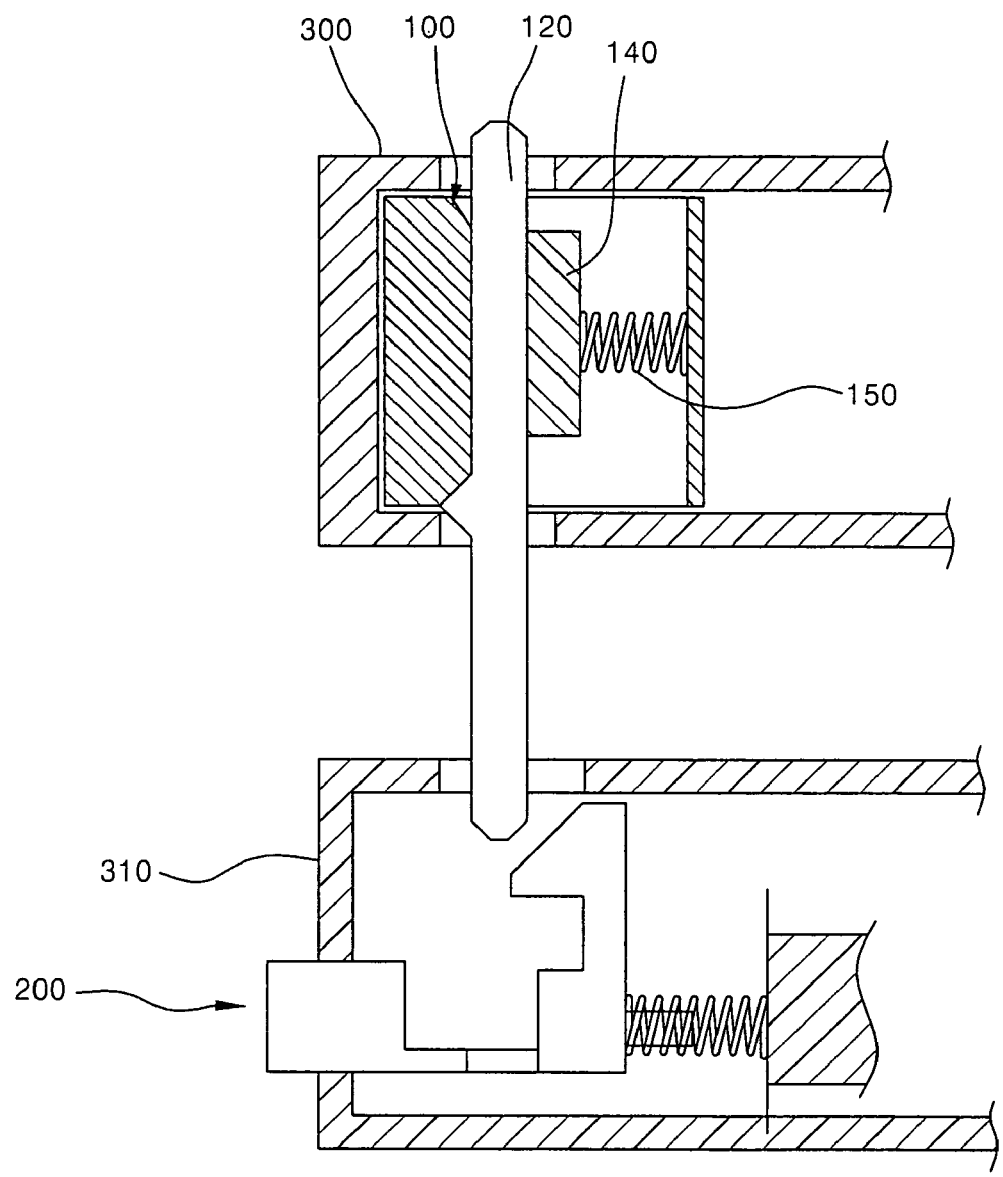
FIG. 2c is diagram showing a sectional view of an electronic apparatus provided with a latch assembly according to a preferred embodiment of the present invention.

FIG. 2a shows a latch unit of a latch assembly according to an embodiment of the present invention, FIG. 2b is an exploded perspective view of the embodiment of the latch unit, and FIG. 2c shows an electronic apparatus employing the embodiment of a latch assembly. As shown in FIG. 2c, a latch unit of a latch assembly can be mounted to a first body 300 (e.g., a display unit) of an electronic apparatus. A keeper 200 of the latch assembly can be mounted to a second body 310 (e.g., a main body) of the electronic apparatus.

As shown in FIGS. 2a–2c, the latch unit of the latch assembly according to the embodiment can include a casing 100, a latch 120, which is seated in a groove 108 formed in the casing 100, a pressure member 140, and resilient members 150. A surface of the latch 120 can abut on the pressure member 140.

The resilient members 150 can be coupled to both ends of the pressure member 140 to resiliently support the pressure member 140. Accordingly, the latch 120 can be supported by the pressure member 140 with a resilient force indirectly exerted on the latch 120.

The pressure member 140 can exert the resilient force on the latch 120 by means of the separate resilient members 150 as shown in FIG. 2a. However, the present invention is not intended to be so limited. For example, it is also possible to exert resilient force on the latch by means of alternative structures such as ones where the resilient members are integrated with the pressure member, for example, a leaf spring, if necessary.

Figure 3A:
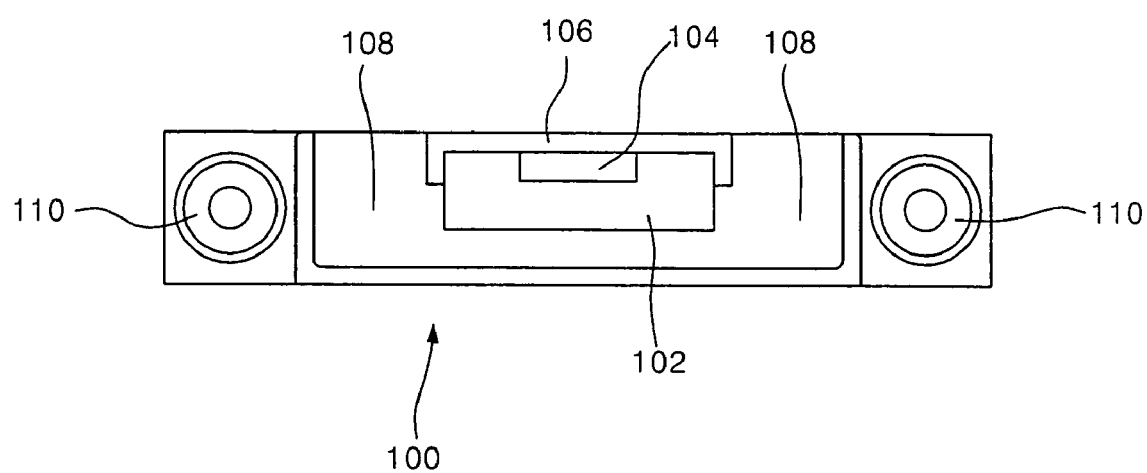
FIGS. 3a and 3b are diagrams showing a front view and a plan view of a preferred embodiment of a casing of a latch assembly according to the present invention, respectively.
Figure 3B:
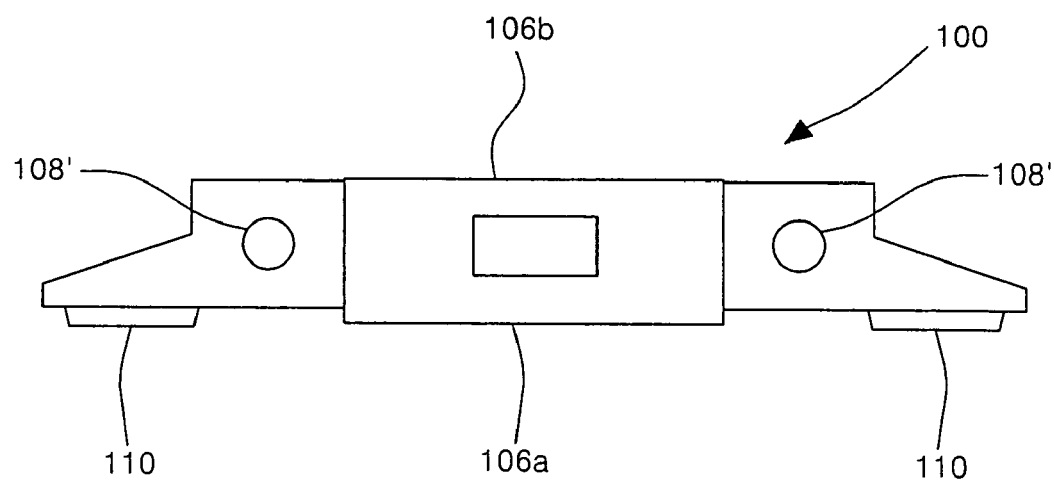

FIGS. 3a–3b shown an exemplary embodiment of the casing 100. As shown in FIGS. 3a and 3b, the seating groove 108 in which the pressure member 140 and the latch 120 are seated can be formed in the casing 100. Further, a passage hole 102 is preferably formed (e.g., at the center) in the casing so that the latch 120 can bidirectionally move therethrough. The passage hole 102 can have a width similar to that of the latch 120 such that the latch 120 can pass therethrough in opposite directions. That is, the passage hole 102 should be formed to have a width slightly larger than the thickness of a frame of the latch, preferably, at least larger than the sum of the thickness of the frame and the height of catching protrusions of the frame.

As shown in FIG. 3a, the seating groove 108 can be formed to conform to the shape of the pressure member 140 and may be variously modified according to shapes of a pressure member and a latch. As shown in FIG. 3b, fitting recesses 108' can be formed at both ends of an upper surface of the casing. The pressure member 140 can be fitted into the fitting recesses 108' so that the lateral position of the pressure member 140 can be secured.

Meanwhile, a latching protrusion 104 can be formed at the passage hole 102 (e.g., at the center) of the casing 100. The latching protrusion 104 is preferably a portion that is fitted into and engaged with latching holes 124a and 124b of the latch. It is preferred that the latching protrusion 104 have a shape similar to that of the latching holes and a size slightly smaller than the area of each of the latching holes. It is also preferred that the thickness of the latching protrusion 104 be similar to or smaller than that of the latch 120. This is because if the latching protrusion 104 is too thick, the smooth bidirectional movement of the latch 120 cannot be ensured.

A surface portion of the casing above the latching protrusion 104 is a catching portion 106. As the latch reciprocally moves in opposite directions, catching protrusions 128 positioned in the middle of the frame come into contact with both ends 106a and 106b (e.g., a front end and a rear end) of the catching portion 106. It is preferred that both ends 106a and 106b of the catching portion 106 be formed with inclined surfaces similar to those of the frame protrusions 128.

Fastening holes 110 can be formed at both ends of the casing 100 to couple the casing 100 to the main body of the electronic apparatus. If the casing 100 is formed as a separate structure as shown in the figure, the casing can be secured to the main body of the electronic apparatus, for example, by means of screws passing through the fastening holes 100 or the like.

The casing 100 may be formed as a separate structure. However, the present invention is not intended to be so limited. Alternatively, the casing 100 can be integrally formed as a part of the main body of the electronic apparatus, if necessary. For example, when a passage hole is formed at a distal end of a display unit of a notebook computer such that the latch can be inserted into and moved through the passage hole in the opposite directions, and the latching protrusion 104 and the catching portion 106 are formed in the passage hole, it is possible to obtain the same effects as the case where the casing is separately formed and mounted on the electronic apparatus.

FIGS. 4a–4d show an exemplary embodiment of the latch 120. As shown in FIGS. 4a to 4d, the latch 120 can have the two rectangular latching holes 124a and 124b on opposite sides in a rectangular frame 122. The frame 122 and latching holes 124a and 124b are preferably rectangular but may take the shape of any one of various configurations such as circle, oval and hexagon. The latching holes 124a and 124b serve to secure the latch 120 in first and second positions within the casing 100 by being engaged with the latching protrusion 104 of the casing 100. Accordingly, the latching holes 124a and 124b can be formed to have a shape corresponding to or similar to that of the latching protrusion 104 of the casing 100. Preferably, the widths of the latching holes are identical or slightly larger to that of the latching protrusion.

Figure 4A:
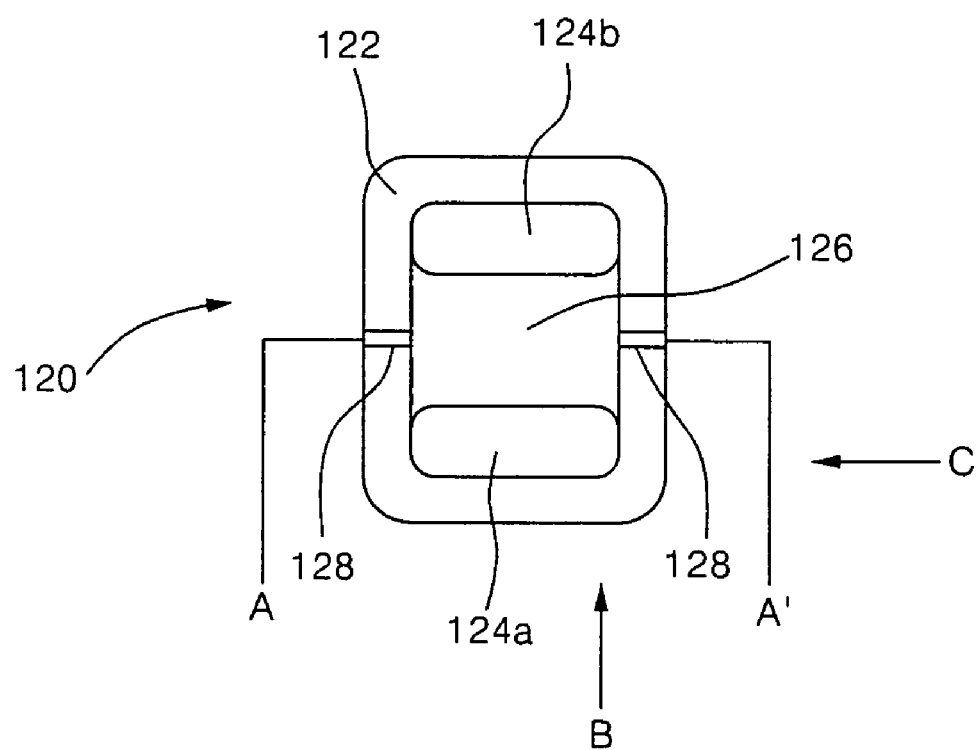
FIGS. 4a to 4d are diagrams showing a plan view, side views and a sectional view of a preferred embodiment of a latch of the latch assembly according to the present invention, respectively.
Figure 4B:
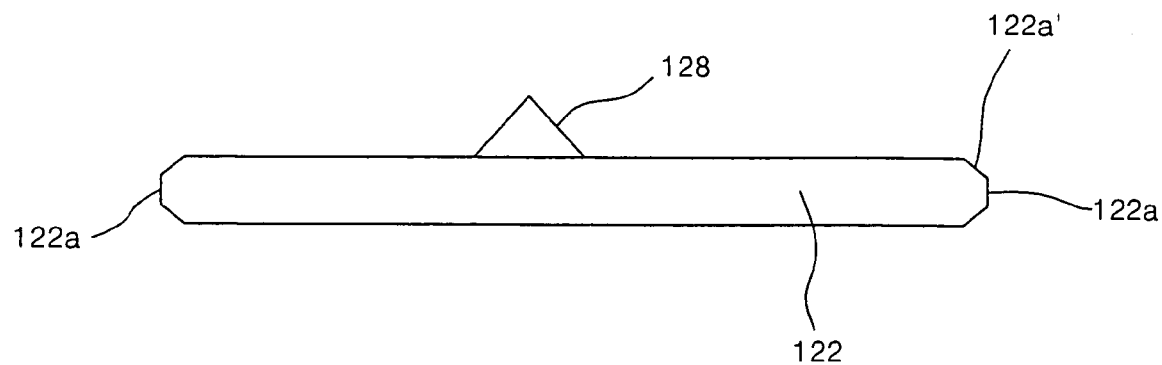

The protrusions 128 can be formed along sides (e.g., at both ends at the center) of the frame 122 of the latch 120. As shown in FIG. 4b, which is a side view obtained when the latch 120 of FIG. 4a is viewed in a direction indicated by arrow C, it can be seen that each of the protrusions 128 can be a triangle of which both sides are inclined. Accordingly, to such a shape, the latch 120 can be moved from the first position to the second position or vice versa only when a force greater than a predetermined value is exerted thereon.

Although each of the protrusions 128 are shown as a triangle having two inclined sides in FIG. 4b, the inclined sides may take the shape of a gentle curve. The protrusions 128 may take any other shapes so far as they can perform their function. At this time, the inclination angle of each of the inclined sides can be an appropriate value such as one selected from a range of 30° to 60°.

Figure 4C:
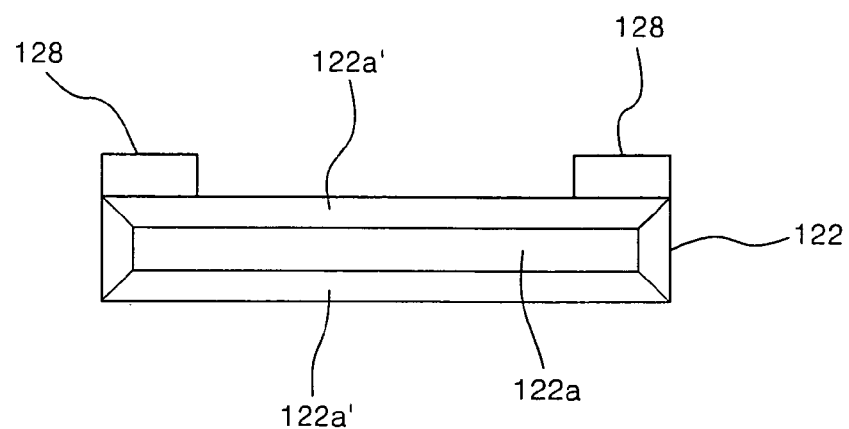

FIG. 4c is a diagram showing a side view obtained when the latch 120 of FIG. 4a is viewed in a direction indicated by arrow B. It can be seen that an end portion 122a of the frame 122 can be provided with bevels 122a'. The configuration of the end portion 122a of the frame 122 can also be seen in FIG. 4b. The bevels 122a' of the end portion 122a can serve to cause a uniform force to be exerted on the latch 120 in an angular direction with respect to the moving direction of the latch 120 during the locking of the latch 120 and the keeper 200. This will be described below. The bevels 122a' may not necessarily planar surfaces but may be gently curved surfaces or the like.

Figure 4D:
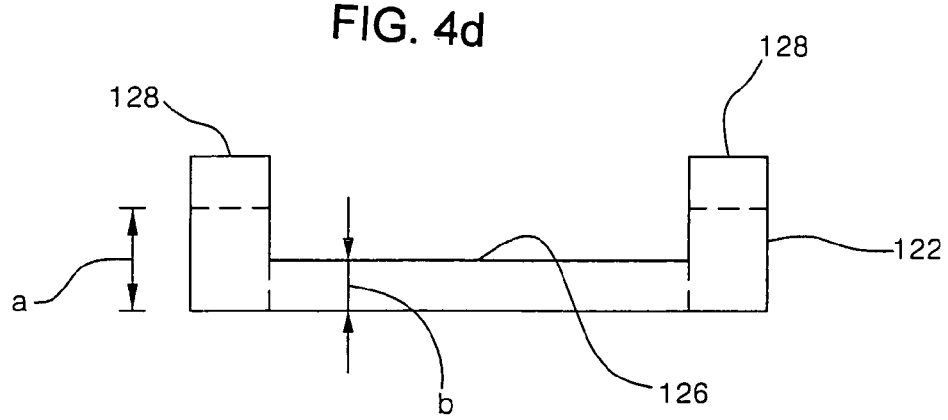

FIG. 4d shows a cross section of the latch taken along line A'—A' in FIG. 4a. Most of edge portions of the frame 122 except the protrusions 128 at the center thereof preferably have the same thickness "a." However, as shown in FIG. 4d, it is preferred that a middle portion 126 of the frame have a thickness "b" smaller than that of the edge portions. A surface of the middle portion 126 of the frame can be a surface abutting on a surface of the pressure member 140 and does not interfere with the latching protrusion 104 of the casing 100 when the latch 120 is moved from the first position to the second position or vice versa. In other words, if the middle portion 126 is thick, the latch cannot smoothly move. Thus, the thickness of the middle portion 126 is preferably smaller than that of the edge portions of the frame 122, more preferably, less than a half of the thickness of the edge portions.

Moreover, it is preferred that the frame be made of a material resistant to abrasion caused by mechanical friction since the middle portion 126 consecutively rubs against the surface of the pressure member 140 and the latching protrusion 104 of the casing 100 as the latch 120 is moved in the opposite directions within the casing 100. For example, the material is preferably synthetic resin based plastic or a material with an abrasion-resistant coated surface.

Figure 5:
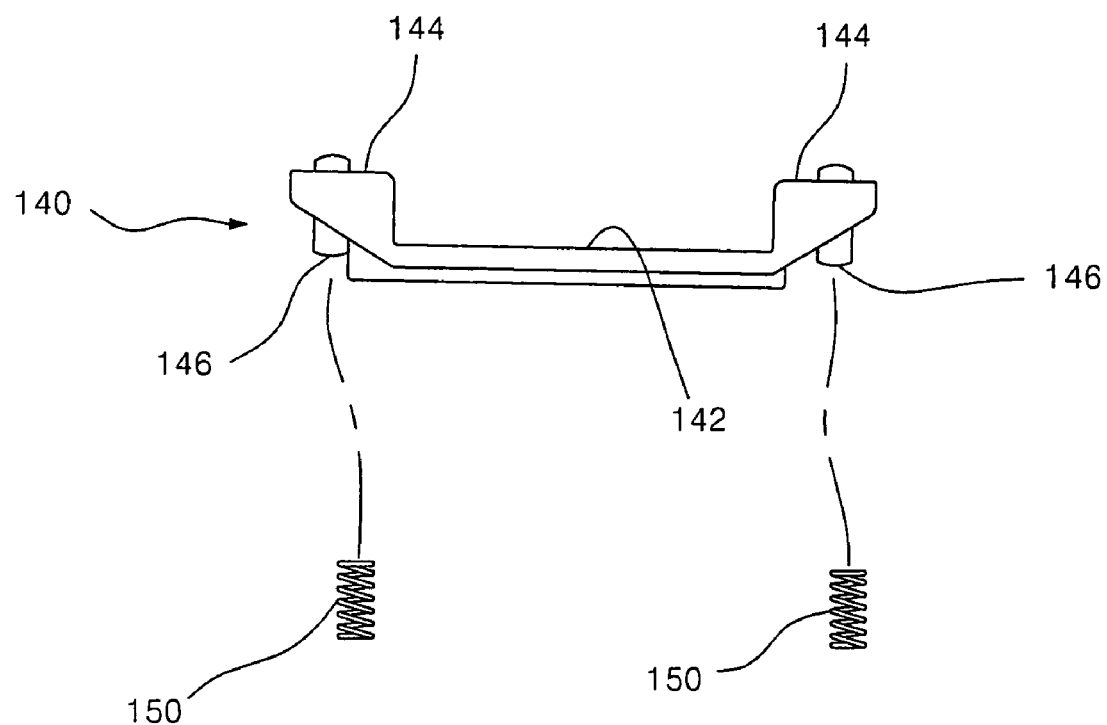
FIG. 5 is a diagram showing a front view of a preferred embodiment of a pressure member of a latch assembly according to the present invention.

FIG. 5 shows an exemplary embodiment of the pressure member 140. As shown is FIG. 5, the pressure member 140 will now be described. The pressure member 140 can include a seat 142 (e.g., at the center thereof) that can abut on a surface of the latch 120, vertical wings 144 formed on the right and left sides of the seat 142, and supporting bosses 146 that can be formed integrally with the vertical wings 144. One end of each of the resilient members 150 can be coupled to one of the supporting bosses 146.

It is preferred that the seat 142 be formed to have a length larger than that of the passage hole 102 of the casing. Accordingly, one surface of the latch can be fully seated on the seat 142.

As described above, the pressure member 140 and the resilient member 150 may be constructed as a single unitary structure, for example, a leaf spring with a seat. Further, if the casing 100 is formed integrally with the main body of the electronic apparatus rather than being separately formed as an independent structure, embodiments of the latch assembly of the present invention may be constructed only with the resilient member 150 without the pressure member 140.

Figure 6A:
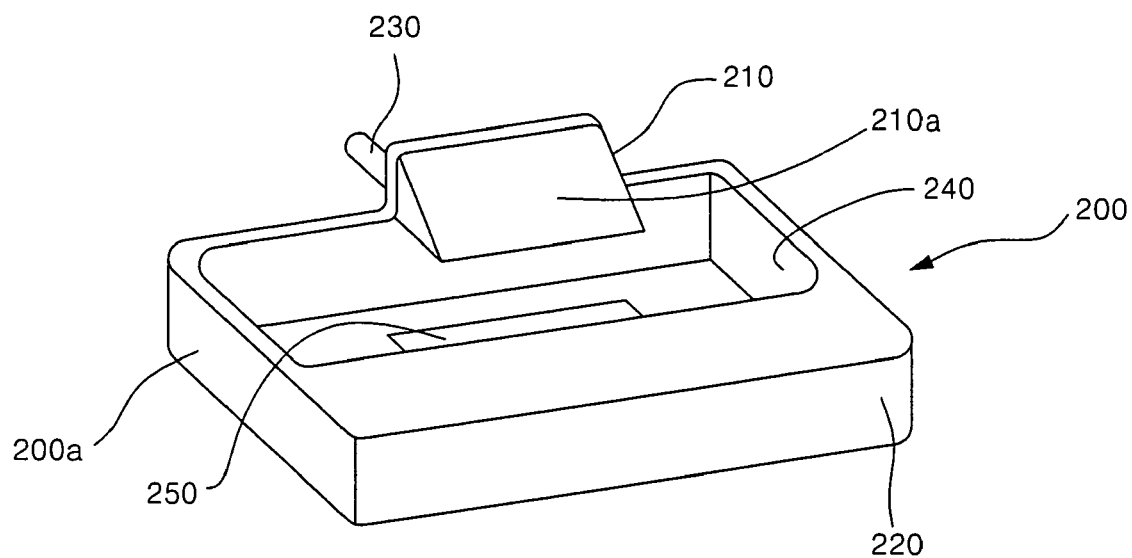
FIGS. 6a and 6b are diagrams showing a perspective view and a side view showing a preferred embodiment of a keeper of the latch assembly according to the present invention, respectively.
Figure 6B:
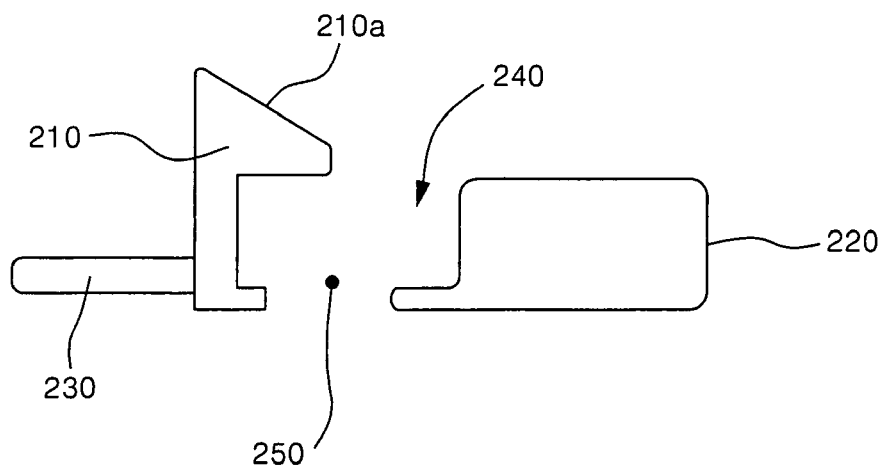

FIGS. 6a–6b show an exemplary embodiment of the keeper 200. As shown in FIGS. 6a–6b, the keeper 200 can provide a locking function to the latch assembly. The keeper 200 can be mounted to the second body (e.g., main body) of the electronic apparatus.

The keeper 200 can be constructed of a single unitary frame, which has a recess 240 therein. The keeper 200 can include a catching step 210 with an inclined surface 210a formed at one side thereof, a press portion 220 in the front of the frame, and a projection 230 in the rear of the frame.

An opening 250 can be formed in a bottom surface of the recess 240 of the frame. The opening 250 can serve to secure a movement path of the latch 120 while the latch 120 is to be locked in the keeper. Thus, the opening is preferably sized to correspond to the size of the latch 120.

The inclined surface 210a of the catching step 210 is preferably formed to conform to the bevels of the end portion 122a of the latch frame 122. The end portion 122a of the frame 122 can abut on the inclined surface 210a of the catching step 210 to cause the catching step 210 to slide so that the keeper 200 can be pushed in a fore and aft direction.

The keeper 200 may be formed unitarily or constructed of several separate components. For example, the catching step 210, the press portion 220 and the projection 230 may be formed as separate components. Alternatively, some of these components may be integrally formed with the main body of the electronic apparatus.

Figure 7:
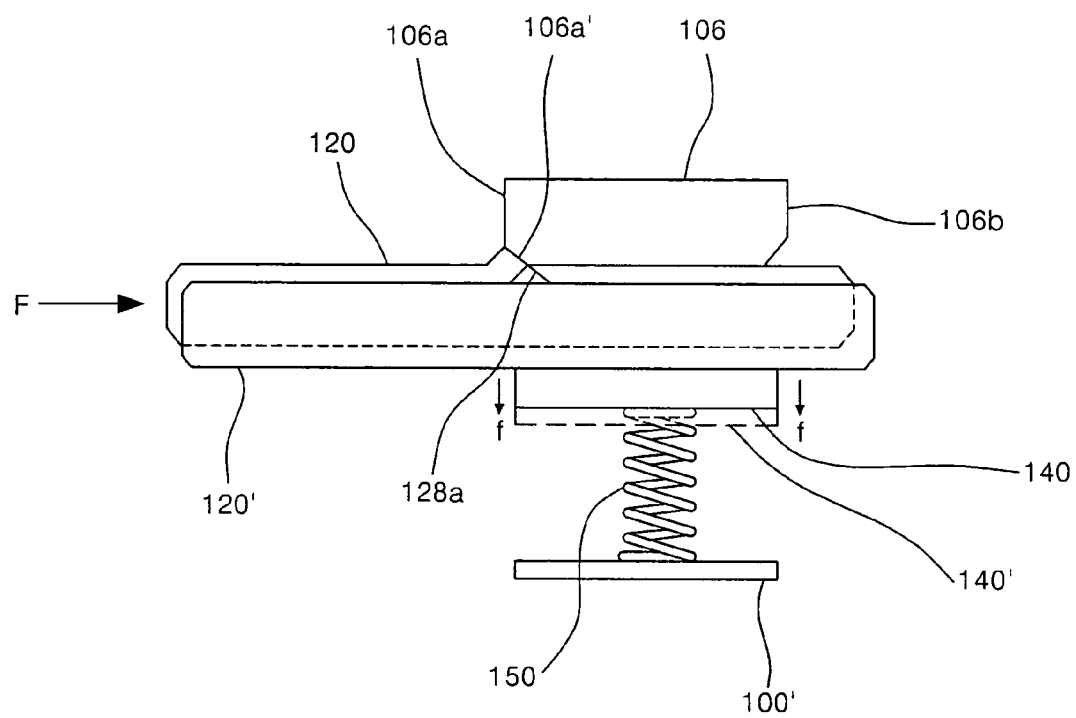
FIG. 7 is diagram showing a sectional view of operations of the latch assembly according to a preferred embodiment of the present invention.

Operations of embodiments of the latch assembly and locking operations through engagement of the latch with the keeper will now be described. FIG. 7 diagrammatically shows a sectional view of the embodiment of the latch assembly of FIG. 2a in a state where the latch 120 and the pressure member 140 are coupled to the casing 100.

The latching protrusion 104 below the catching portion 106 in the upper surface of the casing 100 can be inserted and secured in the latching hole (e.g., 124a in FIG. 4a) of the latch. The pressure member 140 supported by the resilient member 150 on a lower surface of the casing 100 can come into contact with the surface of the latch 120 to cause the latch 120 to be in close contact with the catching portion 106 of the casing. Inclined surfaces 128a of the catching protrusions 128 of the latch 120 can be caught by and abut on the inclined surfaces 106a' of the ends 106a of the catching portion, and thus, the latch is in a stationary state.

In such a state, when a force F greater than a predetermined value is exerted on a side of the latch 120, the inclined surfaces 128a of the protrusions can slide on the inclined surfaces 106a' of the ends of the catching portion, and a force f can be transmitted in a direction perpendicular to the direction of the force F, (e.g. in a downward direction with respect to the latch 120) so that the latch can be moved slightly downward as indicated by the reference numeral 120'. Accordingly, the pressure member 140 that has pushed the surface of the latch 120 can overcome the resilient force and move downward as indicated by the reference numeral 140'. In such a state, when the force F is continuously exerted on the latch, the latch can move horizontally. Then, the protrusions 128 can come into contact with the other end 106b of the catching portion, and the other latching hole (e.g., 124b in FIG. 4a) of the latch can be caught by the latching protrusion (e.g., 104 in FIG. 3a) of the casing 100.

As shown in FIG. 7, using operations described above the latch 120 can reciprocally move. Thus, the latch 120 can move in one direction or an opposite direction with respect to the casing 100.

Figure 8A:
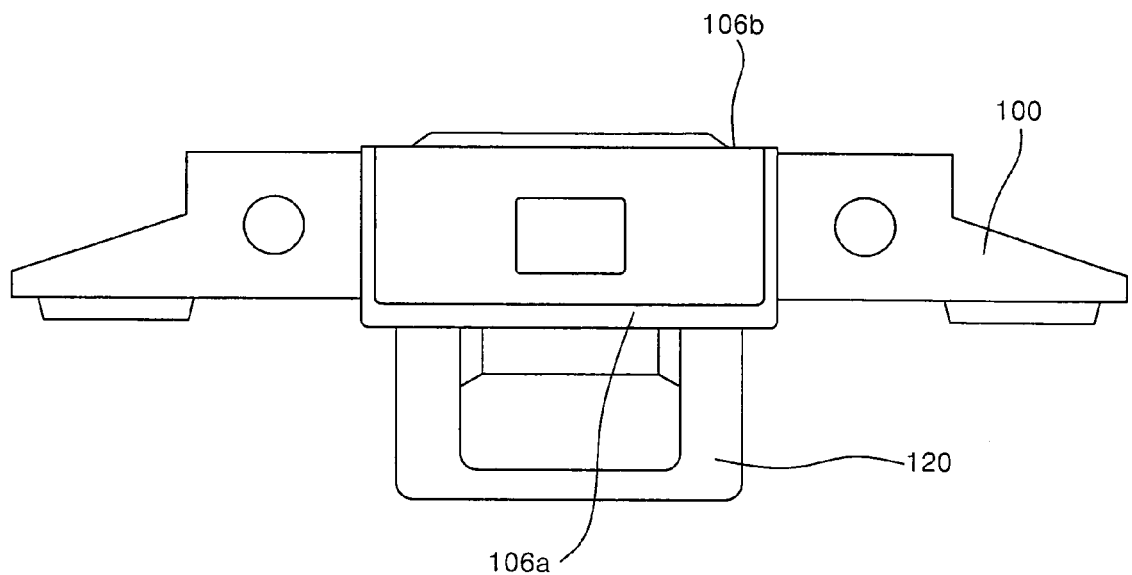
FIGS. 8a and 8b are diagrams showing operational states of the latch assembly according to a preferred embodiment of the present invention.
Figure 8B:
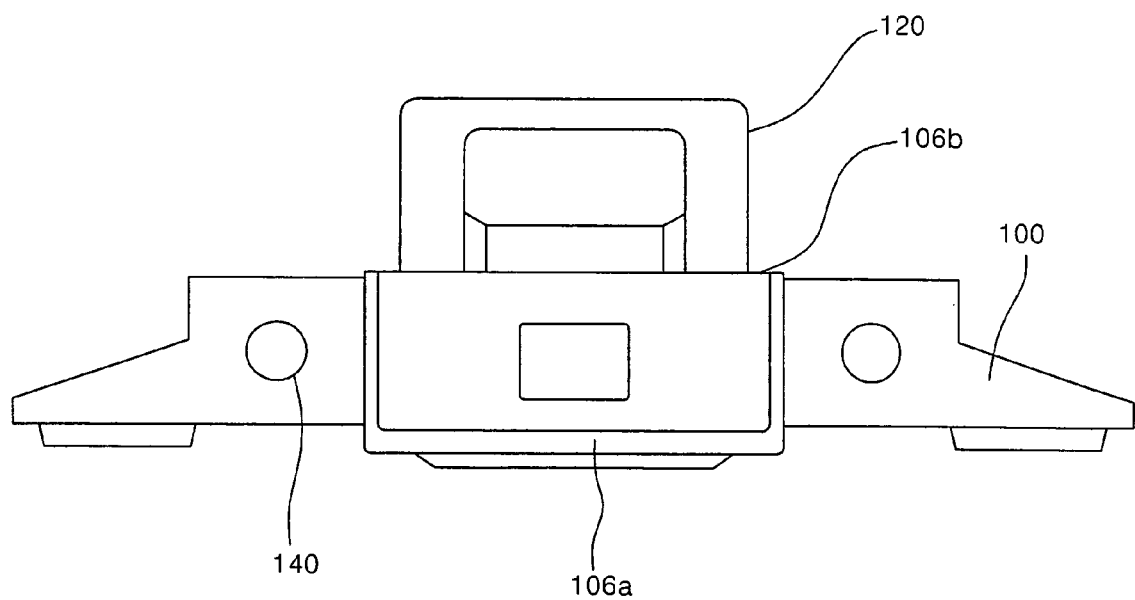

FIGS. 8a and 8b are diagrams that show the latch 120 that has moved in one direction and an opposite direction with respect to the casing 100, respectively. Such bidirectional movement of the latch 120 can be made smoothly by means of the sliding between the inclined surfaces 128a of the protrusions of the latch and the inclined surface 106a' of the ends of the catching portion 106 of the casing 100 and by means of the resilient force transmitted by the pressure member 140. In particular, the latch 120 can be moved preferably with only a force that is exerted when pressing the latch 120 with a finger.

Figure 9A:
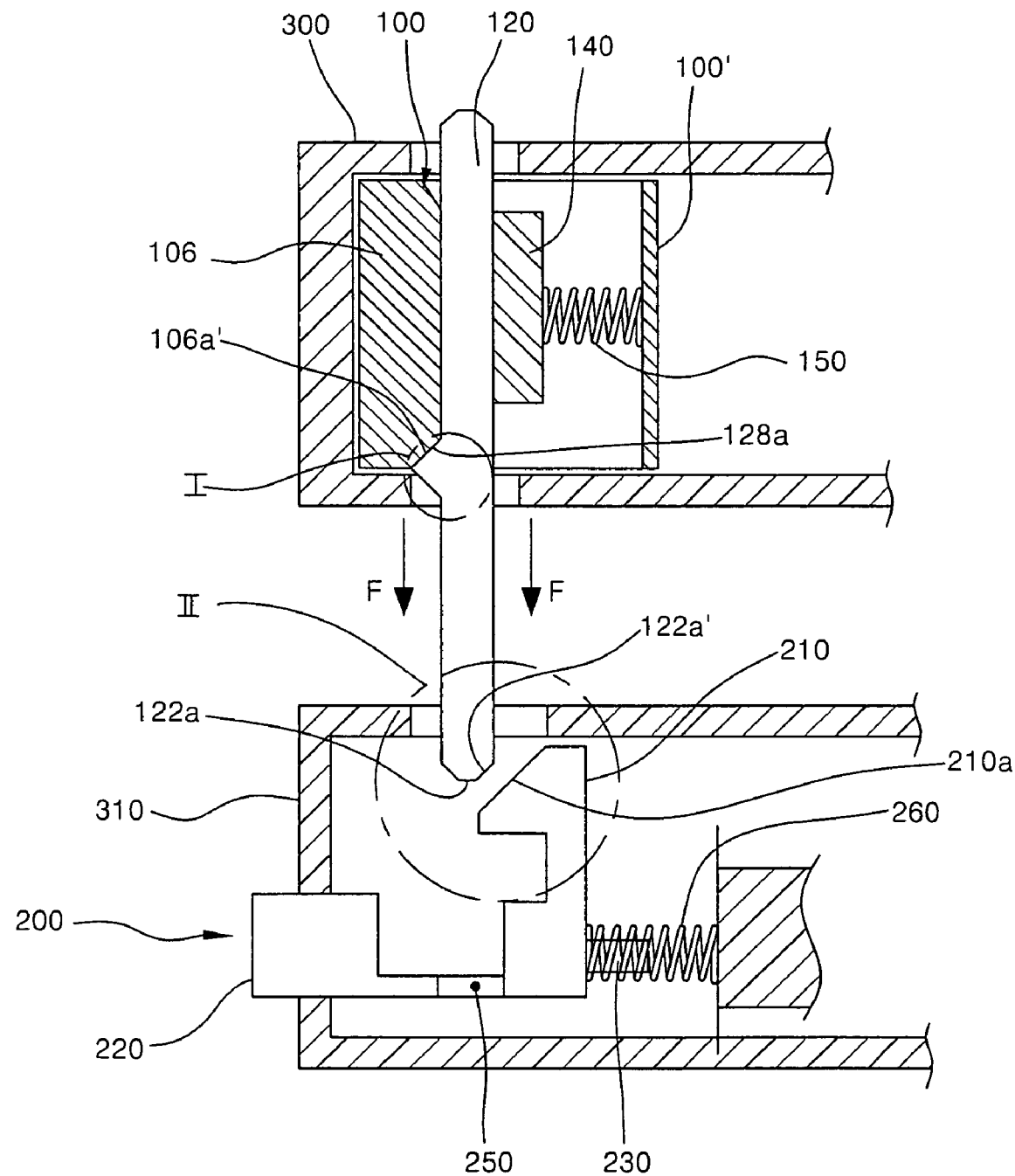
FIG. 9a is a diagram showing a sectional view diagrammatically showing a locking operation of a latch and the keeper of the latch assembly according to a preferred embodiment of the present invention.

Operations of locking a latch unit to the keeper of the latch assembly according to embodiments of the present invention will now be described. FIG. 9a is a diagram that shows the latch unit of the latch assembly can be mounted in the first body 300 of the electronic apparatus. The keeper can be mounted in the second body 310 of the electronic apparatus.

The electronic apparatus may be an apparatus that includes a main body and a separate display unit, such as notebook computer, tablet computer or the like. However, the present invention is not intended to be so limited. For example, the latch assembly according to embodiments of the present invention can be applied to any apparatus that need bidirectional locking.

In a case where the electronic apparatus is a tablet computer, the first body can correspond to the display unit and the second body can correspond to the main body at which a keyboard is installed. One end of the first body can be pivotably coupled to one end of the second body by means of a separate connection member so as to be moved (e.g., pivoted and rotated) in the opposite directions, and other ends of the first and second bodies can be opened or closed.

The latch unit of the latch assembly can be mounted in the first body 300 such that by using operations described above with reference to FIG. 7, the latch can move upward and downward (e.g., in the same direction as or in a direction opposite to gravity) with respect to the first body.

The keeper 200 is preferably installed in the second body 310 such that the vertical position (e.g., first direction) of the keeper 200 can be fixed while moving horizontally (e.g., a second direction different or perpendicular to the first direction). A resilient member 260 can be coupled to the projection 230 in the rear of the keeper 200 to provide a resilient force to the keeper 200 in one direction to preferably limit the horizontal movement of the keeper 200. That is, the resilient member 260 can serve to continuously exert the force on the keeper 200 at the catching step 210 toward the press portion 220.

As shown in FIG. 9a, when the latch 120 of the latch assembly is pressed with a downward force F, either side of the latch 120 can protrude as shown in FIG. 8a or 8b. When the force is continuously exerted in such a state, the end portion 122a of the latch can come into contact with the catching step 210 of the keeper and cause the keeper 200 to slide while overcoming the resilient force of the resilient member 260 coupled to the projection 230. Accordingly, the keeper 200 can move against the resilient force or horizontally backward. Accordingly, a portion of the latch 120 is further moved downward and the catching step 210 (e.g., engagement catch) can then be caught in the latching hole (e.g., 124a in FIG. 4a) or by an engagement portion or engagement protrusion (e.g., rectangular frame 122 in FIG. 4a).

Figure 9B:
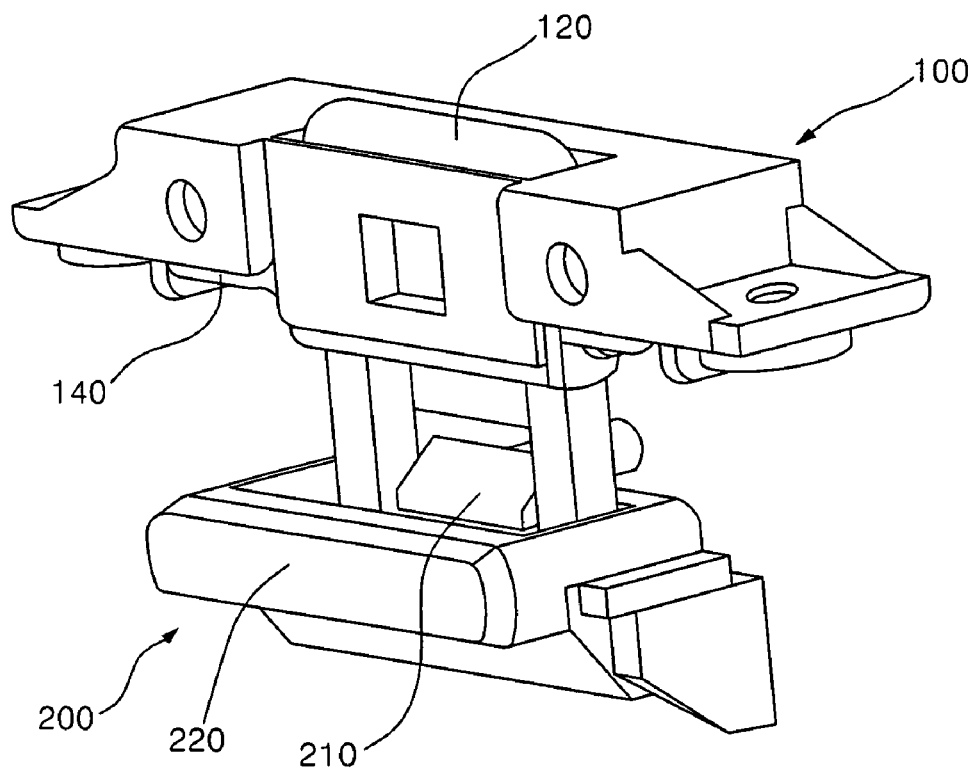
FIG. 9b is a diagram showing a perspective view showing a locked state of the latch assembly according to a preferred embodiment of the present invention.

FIG. 9b is a diagram that shows a state where the latch 120 of the latch assembly has been latched and locked on the catching step 210 of the keeper 200. In such a state, when a force is exerted on the press portion 220 of the keeper 200, the keeper 200 can move horizontally backward and the locking of the latch 120 can be released so that the first body with the latch unit mounted therein can be opened and separated from the second body.

Meanwhile, when the force is exerted on the latch 120 to be locked on the catching step 210 of the keeper, a reaction force acting in a direction opposite to that of the force exerted on the latch 120 is produced. For this reason, there is a possibility that the latch 120 will not slide the keeper 200 but will withdraw in an opposite direction (e.g., move from the state shown in FIG. 8a to the state shown in FIG. 8b) and resulting in the failure of locking operations and a locking function. Embodiments according to the present invention can reduce or prevent the locking failure by modifying the structure of the latch assembly.

Figure 9C:
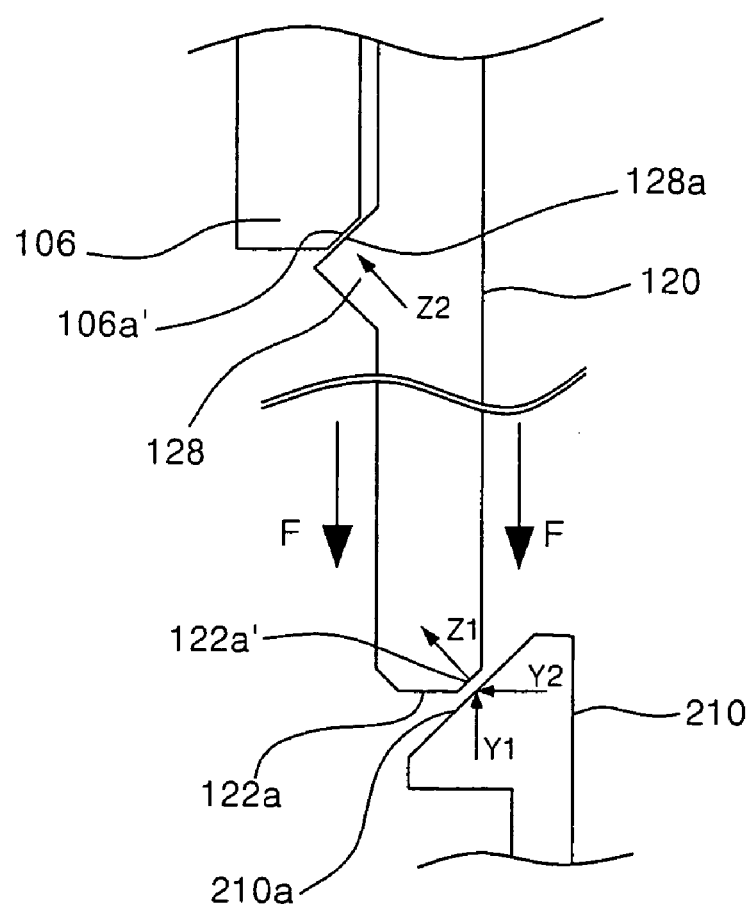

FIG. 9c is a diagram showing an enlarged view of portions I and II in FIG. 9a. FIG. 9c shows force components that can be generated while the keeper 200 is slid by the latch 120.

As shown in FIG. 9c, when an external force F is exerted on the latch 120 that in turn moves toward the keeper 200, one of the bevels 122a' of the end portion 122a of the latch preferably comes into contact with the inclined surface 210a of the catching step 210. In response to the force exerted on the latch 120, the keeper 200 that is vertically fixed can exert a reaction force Y1 on the latch in the opposite direction. In addition, because of the resilient member (e.g., 260 in FIG. 9a) coupled to the projection 230 in the rear of the keeper 200, another force Y2 can be exerted on the keeper 200 in a horizontal direction. The directions of the two forces are perpendicular to each other, and a resultant force Z1 of the two forces can be exerted (e.g., at an angle of about 45 degrees) on the latch 120 abutting against the inclined surface 210a of the catching step 210.

The resultant force Z1 can be exerted on substantially the entire latch 120 and thence the protrusions 128 of the latch 120. In a state where the inclined surfaces 128a of the protrusions 128 of the latch come into contact with the inclined surface of the end 106a of the catching portion 106 of the casing 100, a force Z2 equal to the resultant force Z1 can be exerted on the contact surfaces (e.g., protrusions 128) in a normal direction. The force Z2 exerted on the inclined surfaces of the end 106a of the catching portion 106 of the casing 100 can substantially prevent the inclined surfaces 128a of the protrusions 128 from sliding on the inclined surfaces of the end 106a of the catching portion 106. In other words, because of the force exerted on the inclined surfaces of the protrusions 128 in the normal direction rather than the force longitudinally exerted on the frame 122 of the latch 120 (e.g., the pressing force for moving the latch), the latch 120 can be caught by the end of the casing 100, and thus, the relative position of the latch 120 with respect to the casing 100 is fixed. Accordingly, the latch 120 cannot further slide the keeper 200 and can be originally prevented from withdrawing.

According to embodiments of the present invention, (e.g., using such a mechanism), the latch 120 can be smoothly locked on the keeper 200. In addition, by selecting each resilient member 150 coupled to the pressure member 140 such that the resilient force thereof is larger than that of the resilient member 260 of the keeper 200, the latch 120 moves while pressing the pressure member 140. Thus, a likelihood of locking failure of the latch 120 on the keeper 200 can be reduced or reliably prevented.

Figure 10A:
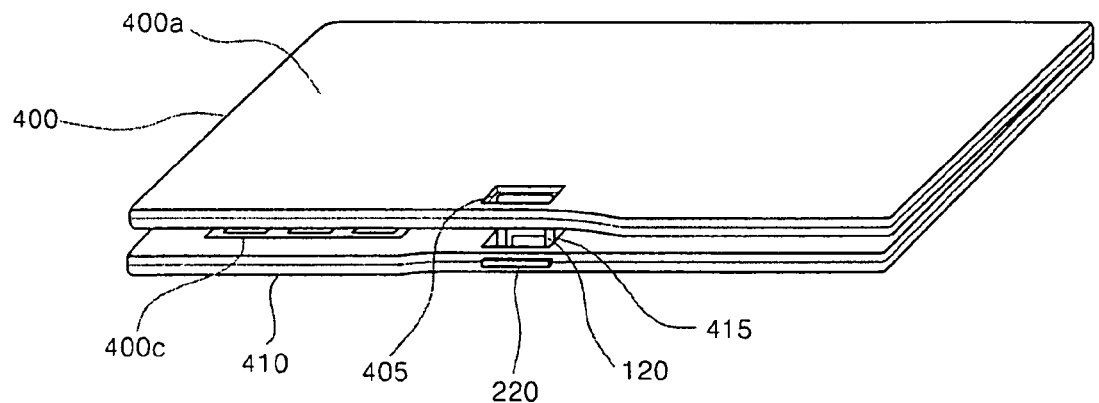
FIGS. 10a–10c are diagrams showing perspective views of preferred embodiments of an electronic apparatus.
Figure 10B:
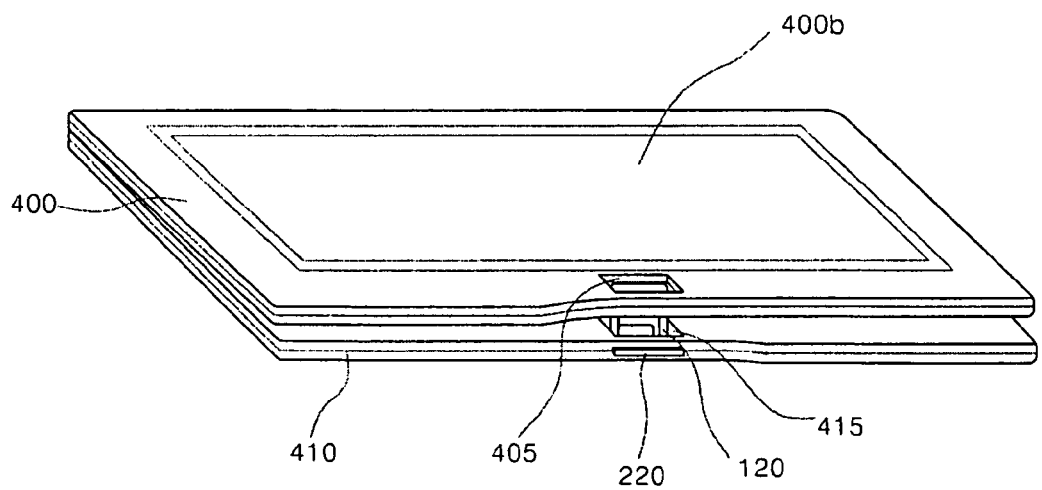

FIGS. 10a and 10b are diagrams showing perspective views of an electronic apparatus mounted with the embodiment of latch assembly. The latch unit of the latch assembly can be mounted in an end portion of a first body 400 where an opening 405 for the bidirectional movement of the latch 120 can be formed. The keeper 200 of the embodiment of the latch assembly can be mounted in a corresponding end portion of the second body 410 where a hole 415 through which the latch 120 passes can be formed.

FIG. 10a shows a locking state where a display surface 400b of a first body (e.g., display unit) of the electronic apparatus faces a second body (e.g., main body) 410 of the electronic apparatus that can include at least an input device (e.g. keyboard 400c, touch screen, etc.) while a rear surface 400a of the first body faces upward. When the first body 400 is pressed downward in a state where the latch 120 has been moved downward (e.g., because of the force exerted thereon), the first body 400 and the second body 410 are coupled to each other by means of the locking action of the latch 120 and the keeper 200.

When the first body 400 is intended to be separated from the second body 410 and opened, the locking state of the latch 120 can be released by exerting a force on the press portion 220 of the keeper 200 so that the keeper 200 can be moved horizontally backward (e.g., horizontally). Thereby, the first body 400 and the second body 410 are preferably separated.

Figure 10C:
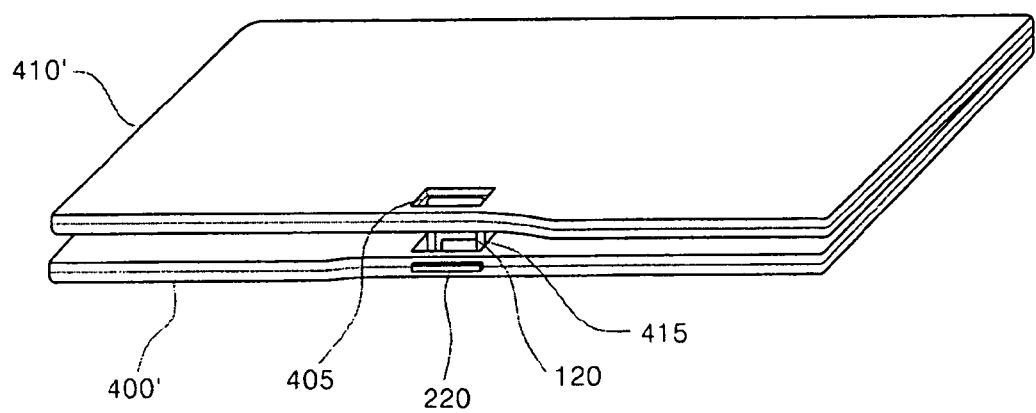

As shown FIG. 10b, even in a state where the first body 400 is rotated in the opposite direction with respect to the second body 410 such that the display surface 400b faces upward and the rear surface 400a faces the second body 410 the first body 400 and the second body 410 can be coupled to each other in using the same operations. Thus, the bidirectional latch assembly can reversibly couple the electronic apparatus. As shown in FIG. 10c. the latch 120 can be mounted in a second body 410' and the hole 405 can be in a first body 400'.

The first body 400 can be directly coupled to the second body 410 in the embodiment of the latch assembly because of cooperation between the latch 120 and the catching step 210 described above (e.g., with reference to FIG. 9c). The first body 400 can be coupled without exerting any additional force on the latch 120 in a state where one side of the latch 120 protrudes in one direction from the first body 400.

Any reference in this specification to "an embodiment," "another embodiment," "exemplary embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of the latch assembly, methods for the same and electronic apparatus using same have various advantages. For example, in an apparatus including first and second bodies, the first body can be selectively latched to the second body such that either one of the surfaces of the first body faces the second body. A latch of the latching assembly can be moved reciprocally in opposite directions by exerting a small force on the latch. Embodiments of the latch assembly can pass through a hole in a first body and can allow the first and second bodies to be directly coupled to each other without exerting any additional force on the latch in a state where the latch has been moved and fixed. Embodiments of a latch assembly can enable the use of both surfaces of an apparatus and can be applied to a variety of apparatuses.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A bidirectional latch assembly, comprising:
    a casing configured with a seating groove, wherein the seating groove includes a passage hole;
    a latch inserted into the passage hole having one surface movably seated in the seating groove, wherein the latch comprises a frame configured with a pair of opposing latching holes, and a pair of catching protrusions on lateral edges of the frame; and
    a keeper configured to selectively engage with either one of the pair of latching holes.

2. The latch assembly of claim 1, comprising a pressure member in the seating groove configured with a seat on one side thereof, wherein resilient members are coupled to both lateral ends of the pressure member and configured to urge a surface of the seat toward the latch.

3. The latch assembly of claim 1, comprising a latching protrusion configured to engage with either one of the latching holes coupled to an upper portion of the passage hole of the casing, wherein the latching protrusion has corresponding dimensions smaller than that of each latching hole of the latch.

4. The latch assembly of claim 1, wherein front and rear ends of an upper surface of the passage hole of the casing are configured to have inclined surfaces, respectively.

5. The latch assembly of claim 4, wherein the catching protrusion of the latch is adjacent one of the inclined surfaces of the casing when the latch is fixed.

6. The latch assembly of claim 4, wherein the inclined surfaces at the ends of the upper surface of the passage hole have a corresponding angle of inclination as the catching protrusion of the latch, wherein the angle of inclination is formed, linearly, non-linearly or non-continuously.

7. The latch assembly of claim 1, wherein inclined surfaces symmetric with each other are formed at each of both ends of the frame of the latch.

8. The latch assembly of claim 1, wherein the keeper comprises:
    a catching step configured to protrude vertically from one side of the keeper with an inclined surface at an upper portion thereof;
    a press portion configured to protrude horizontally from the other side of the keeper; and
    a resilient member coupled to the catching step and configured to urge the catching step toward the press portion.

9. The latch assembly of claim 8, comprising a pressure member in the seating groove configured with the seating surface on one side thereof, wherein resilient members are coupled to both lateral ends of the pressure member and configured to urge the seat toward the latch, and the resilient members coupled to the pressure member exert resilient forces larger than that of the resilient member coupled to the catching step.

10. The latch assembly of claim 8, wherein inclined surfaces symmetric with each other are formed at each of both ends of the frame of the latch, and the inclined surfaces at the both ends of the frame have an angle of inclination corresponding to the inclined surface of the catching step.

11. The latch assembly of claim 1, wherein a portion of the latch between the pair of the latching holes has a thickness smaller than the lateral edges of the frame.

12. An electronic apparatus, comprising:
    a first body configured with a passage hole extending through one side portion;
    a latch mounted in the passage hole of the first body having a frame with a pair of engagement portions on opposite sides;
    a second body rotatably coupled to the first body and having a recess on one surface thereof; and
    an engagement catch mounted in the recess of the second body configured to engage at least one engagement portion on the frame, wherein front and rear ends of a surface of the passage hole are configured to have at least one inclined surface, respectively, and wherein a catching protrusion of the latch is adjacent to said at least one inclined surface when the latch is fixed.

13. The electronic apparatus of claim 12, wherein a first engagement portion of the pair of engagement portions extends outside a first side of the first body in a first position of the latch in the passage hole, and wherein a second engagement portion of the pair of engagement portions extends outside a second side of the first body in a second position of the latch in the passage hole.

14. The electronic apparatus of claim 13, wherein in a closed position the first body is adjacent the second body and one of the engagement portions extends into the recess.

15. The electronic apparatus of claim 12, wherein the recess is formed with a latching protrusion that engages with either one of the engagement portions.

16. The electronic apparatus of claim 12, wherein a through-hole is formed on said one side portion of the first body, wherein a casing having a seating groove therein is installed in the through-hole and the passage hole is in the casing.

17. The electronic apparatus of claim 16, further comprising a pressure member seated in the seating groove and having a seating surface on one side thereof determining one side of the passage hole, and a resilient member coupled to another side of the pressure member.

18. The electronic apparatus of claim 12, wherein the engagement catch comprises:
a catching step configured to protrude vertically from one side of a keeper with an inclined surface; and
a press portion configured to protrude horizontally from the other side of the engagement catch.

19. The electronic apparatus of claim 12, wherein the electronic apparatus is a tablet computer or a notebook computer.

20. The electronic apparatus of claim 12, wherein in a closed position the first body is adjacent the second body and one of the engagement portions extends into the recess, wherein the latch has a pair of catching protrusions on lateral edges of the frame, wherein each of front and rear ends of an upper surface of the passage hole are configured to have inclined surfaces, respectively.

21. The apparatus of claim 12, wherein the second body has a display surface and the first body has an input device.

22. The apparatus of claim 12, wherein the first body has at least one display surface and the second body has a keyboard.

23. A method of latching a portable computer having a first body rotatably coupled to one side of a main body, wherein the first body has a first surface adjacent to the main body in a first closed position and an opposite surface adjacent to the main body in a second closed position of the portable computer, the method comprising:
providing a bi-directional latch in a through hole of the first body to latch the first body to the main body in the closed positions;
releasing an engagement catch of the main body from a first engagement protrusion of the bi-directional latch in the first closed position;
pressing the first engagement protrusion to position a second engagement protrusion of the bi-directional latch;
releasing the first engagement protrusion; and
moving the first body to the second closed position to latch the second engagement protrusion in the engagement catch, wherein the first and second engagement protrusions extend from opposite sides of the first body, wherein the latch has at least one catching protrusion on the frame, wherein front and rear ends of an upper surface of the passage hole are configured to have at least one inclined surface, respectively, and wherein said moving comprises said at least one inclined surface providing force against said at least one catching protrusion of the latch for at least a portion of the time the engagement catch of the main body presses against the second engagement protrusion during capture of the second engagement protrusion by the engagement catch.

24. The method of claim 23, wherein said at least one catching protrusion of the latch is adjacent to an inclined surface when the latch is fixed.

25. A method of latching a portable computer having a first body rotatably coupled to one side of a main body, wherein the first body has a first surface adjacent to the main body in a first closed position and an opposite surface adjacent to the main body in a second closed position of the portable computer, the method comprising:
providing a bi-directional latch in the first body to latch the first body to the main body in the closed positions;
releasing an engagement catch of the main body from a first engagement protrusion of the bi-directional latch in the first closed position;
moving the first body to the second closed position where no portion of the bi-directional latch extends within the main body; and
pressing only the first engagement protrusion of the hi-directional latch to move and latch a second engagement protrusion of the bi-directional latch in the engagement catch, wherein the first and second engagement protrusions extend from opposite sides of the first body.

26. The method of claim 25, wherein said pressing completes the transition from an unlatch condition to a latched condition between the first and main body, and wherein the first and second engagement protrusions extend from opposite sides of the first body and ends of the bi-directional latch.

27. An electronic apparatus, comprising:
a first body formed with a passage hole extending through one side portion;
latching means for latching mounted in the passage hole of the first body having a frame with a pair of engagement protrusions that protrude on opposite sides in first and second positions, respectively;
a second body rotatably coupled to the first body and having a recess on one surface thereof; and
engaging means for engaging the latching means mounted in the recess of the second body, wherein the engaging means comprises,
catching means protruding from one side of a keeper with an inclined surface for latching the latching means, and
press portion means protruding from the other side of the engagement means for releasing the latching means, wherein the latching means has at least one protruding means on the frame for extending at an angle from the frame, and wherein the passage hole has at least one inclined surface means for releasably coupling the protruding means, and wherein the protruding means of the latching means is adjacent said at least one inclined surface means when the latching means is latching in the second body.

28. The electronic apparatus of claim 27, wherein in a closed position the first body is adjacent the second body and one of the engagement protrusions extends into the recess.

29. A portable computer having a first body rotatably coupled to one side of a main body, wherein the first body has a first surface adjacent to the main body in a first closed position of the portable computer and an opposite surface adjacent to the main body in a second closed position, the portable computer, comprising:
a latch in a passage hole of the first body configured with first and second engagement protrusions that protrude on opposite sides of the first body in first and second positions, respectively; and
an engagement catch in a recess of the main body configured to engage the latch in the closed positions, wherein the latch has at least one catching protrusion on the frame, wherein an upper surface of the passage hole is configured to have at least one inclined surface, and wherein a catching protrusion of the latch is adjacent to an inclined surface when the latch is fixed.

30. The portable computer of claim 29, wherein the latch has a pair of catching protrusions on lateral edges of a frame, wherein front and rear ends of an upper surface of the passage hole are configured to have inclined surfaces, respectively, and wherein the catching protrusion of the latch is adjacent one of the inclined surfaces when the latch is in the first and second positions.

* * * * *